July 11, 1933.　　　　W. CAMERON　　　　1,917,359
CAN MAKING MACHINE
Filed April 28, 1930　　　7 Sheets-Sheet 1

Inventor:
William Cameron
By Wilson, Dowell, McConna & Rehm Att'ys.

July 11, 1933.  W. CAMERON  1,917,359
CAN MAKING MACHINE
Filed April 28, 1930   7 Sheets-Sheet 2

Inventor:
William Cameron
By: Wilson, Dowell, McCanna & Rehm
Attys.

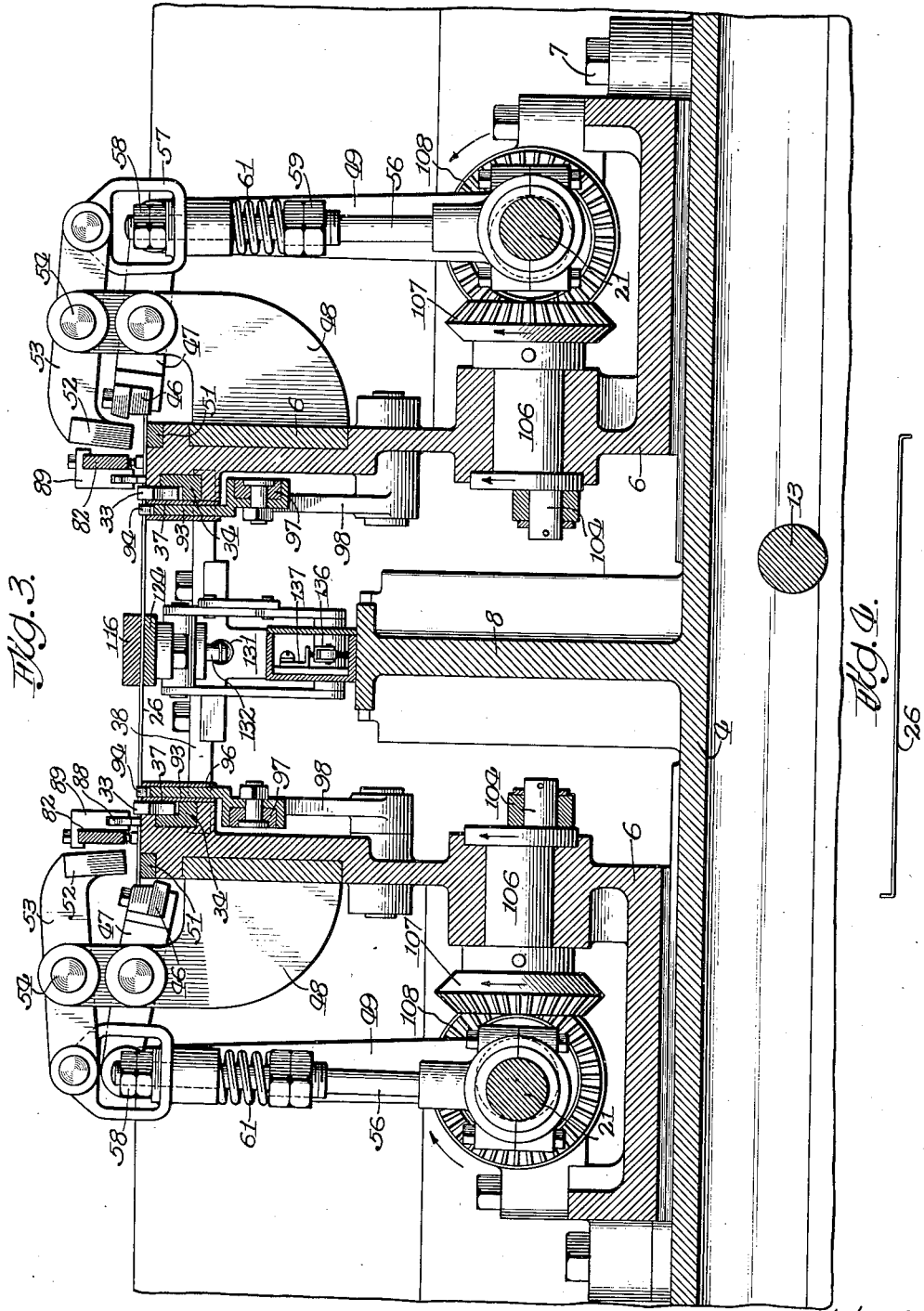

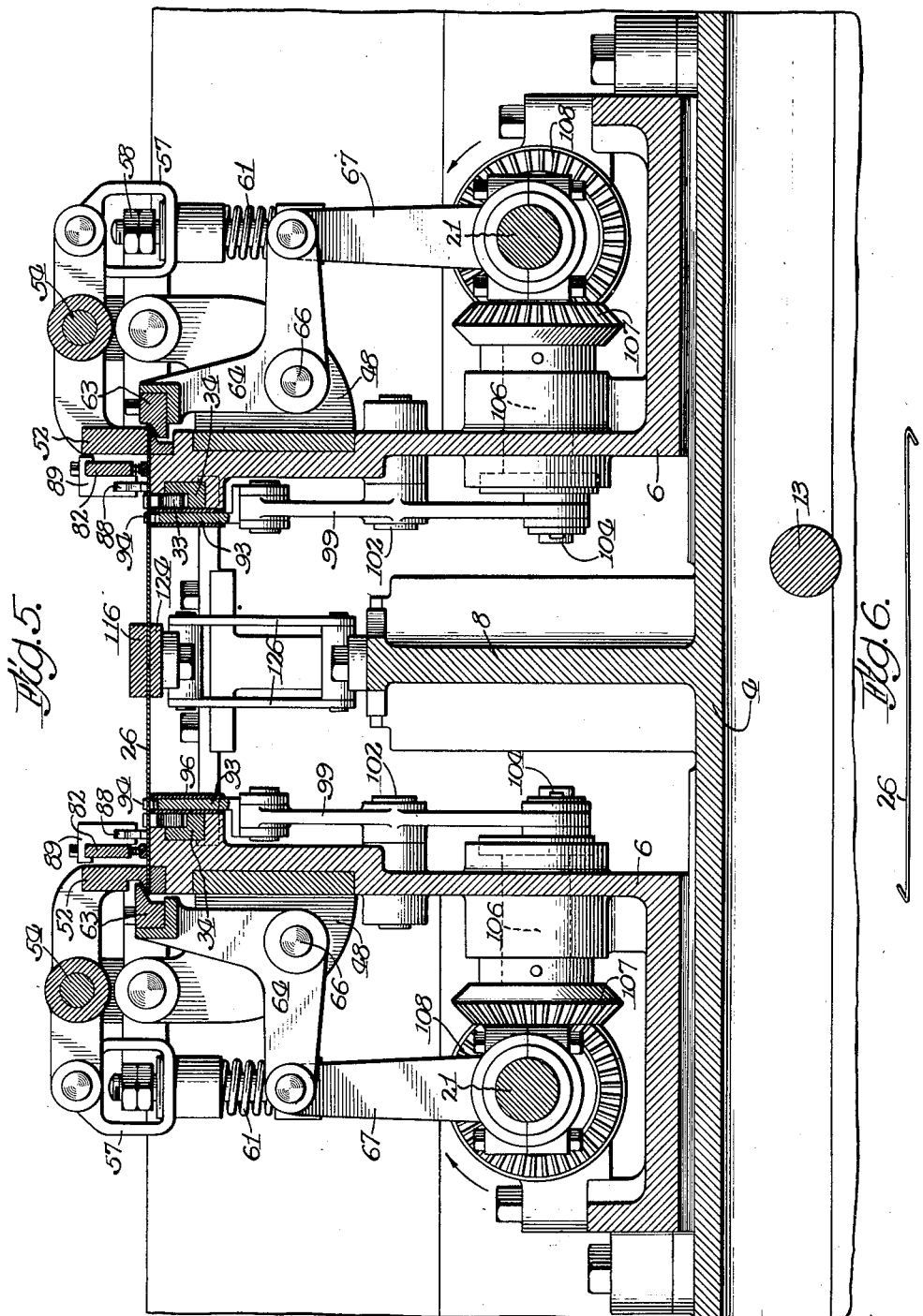

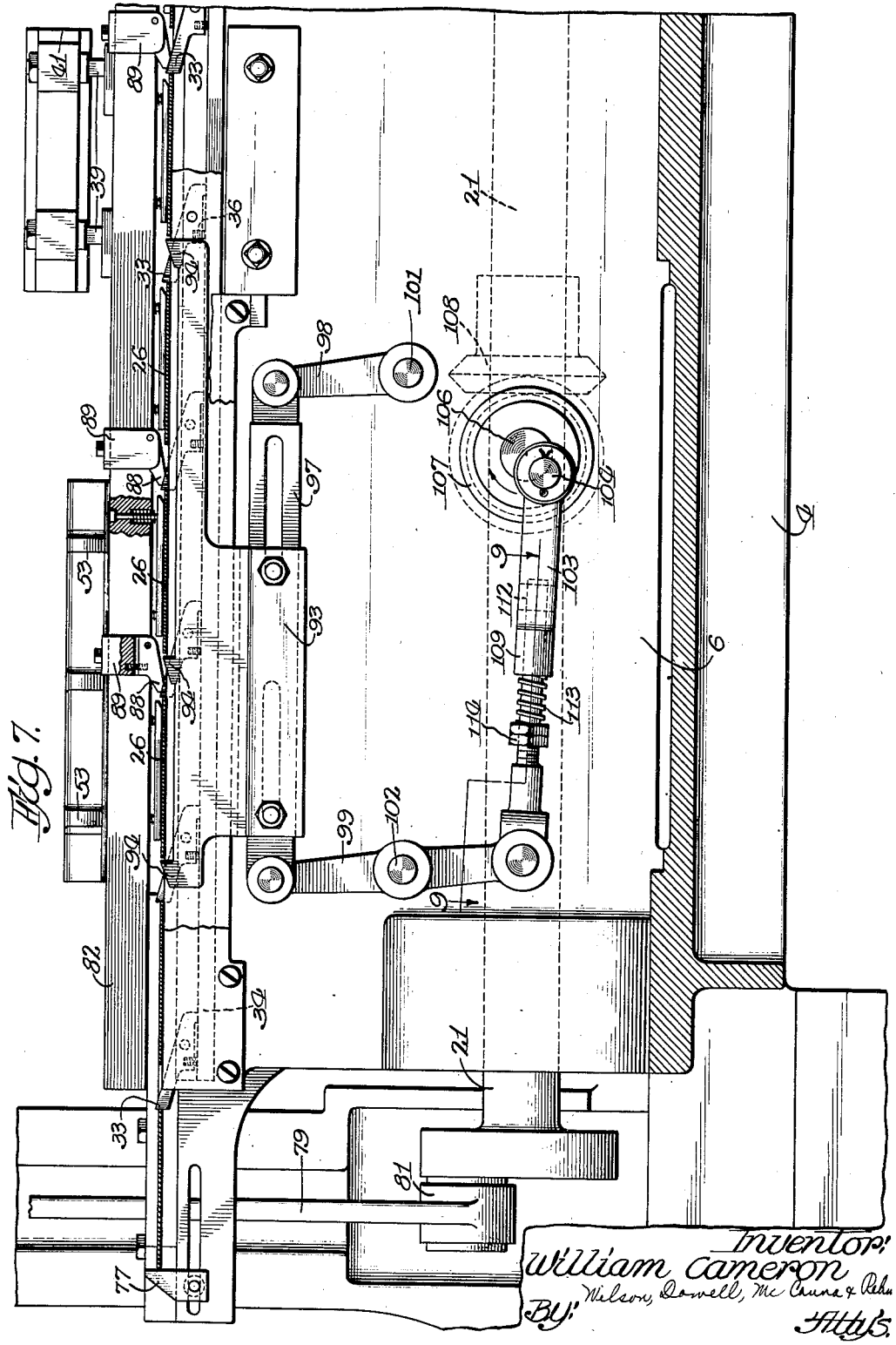

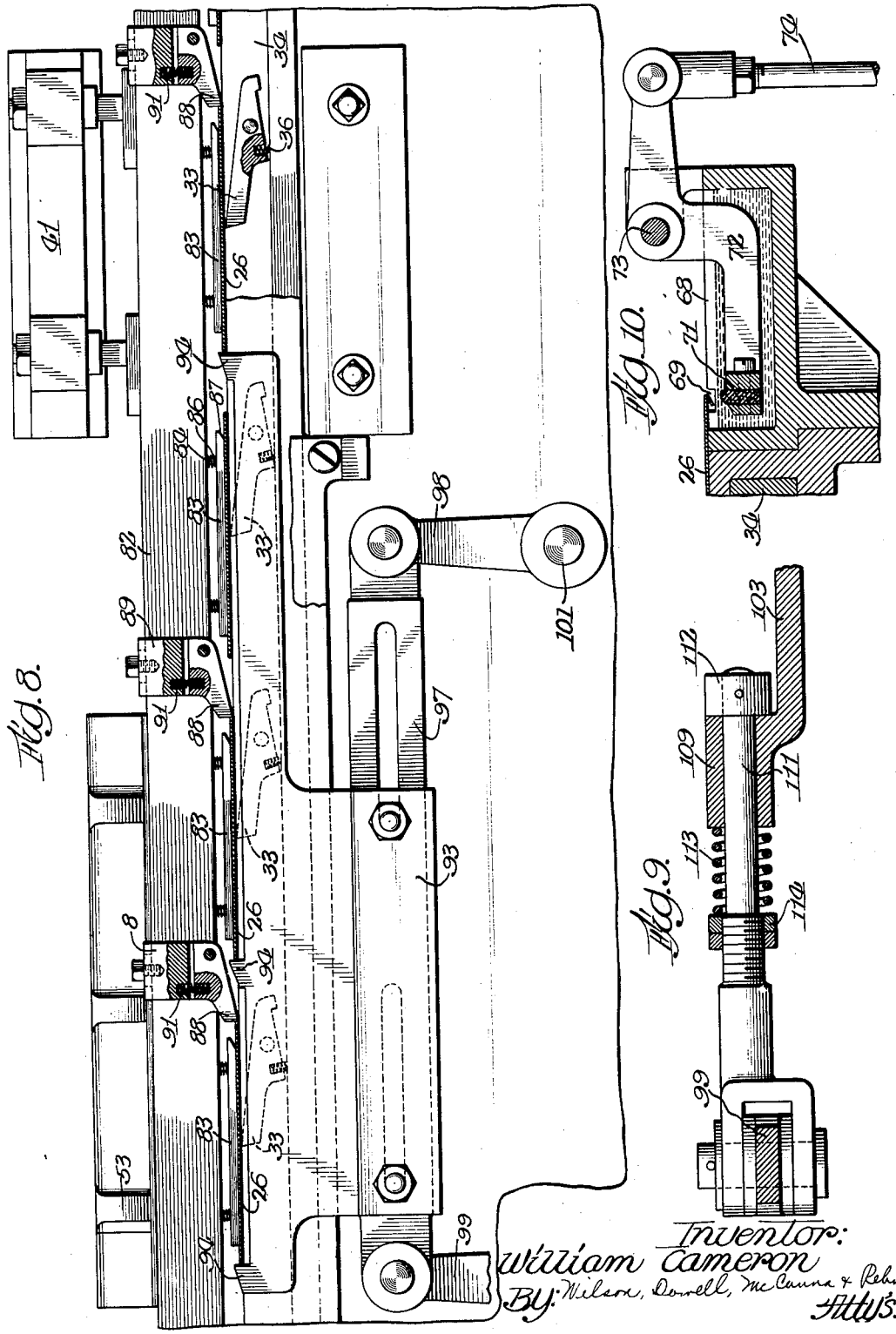

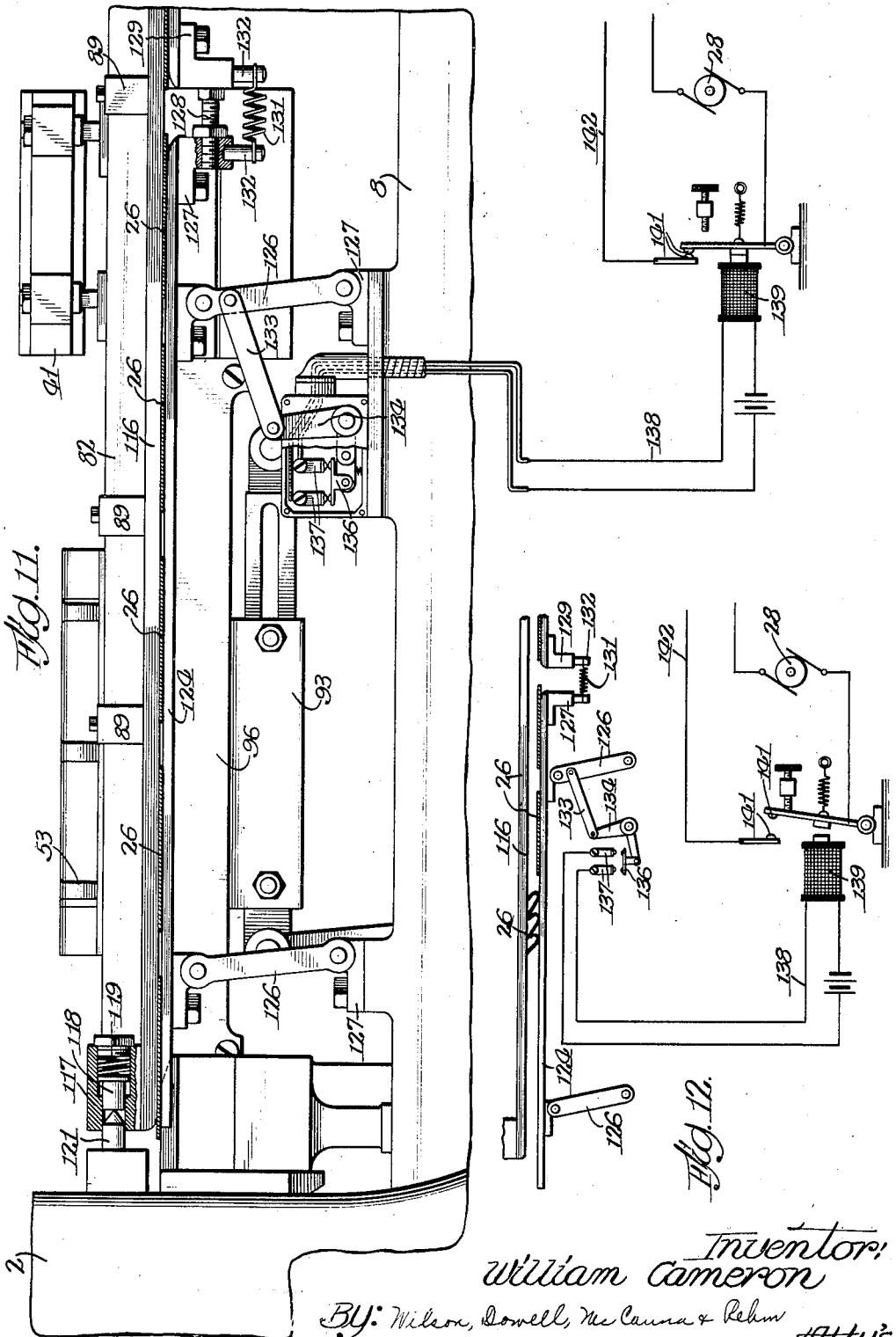

Patented July 11, 1933

1,917,359

UNITED STATES PATENT OFFICE

WILLIAM CAMERON, OF CHICAGO, ILLINOIS, ASSIGNOR TO CAMERON CAN MACHINERY CO., OF CHICAGO, ILLINOIS, A CORPORATION OF ILLINOIS

CAN MAKING MACHINE

Application filed April 28, 1930. Serial No. 447,914.

This invention relates to can making machines and more particularly to that unit for making bodies generally known as a lock seamer.

Machines of this type are designed to form can bodies from flat tin blanks. In general the blanks are fed from a stack or magazine by suitable feeding devices to a slide along which they are conveyed by suitable operating stations for notching and edging the blanks. The slide terminates in a horn around which the flat blanks are formed and the side seam hooked to form a can body. The formed can bodies are then usually delivered to a soldering attachment or section which is run in timed relation to receive the can bodies from the horn and solder the side seam.

The tendency has been to increase the speed of the machines to the order of three hundred a minute and many attempts have been made to provide a lock seamer which would operate at this and greater speeds rather than at the usual rate of one hundred and fifty a minute. Considerable difficulty has been encountered, however, at speeds of the higher orders particularly in starting and stopping the machines upon interruptions caused by abnormal conditions such as the occurrence of a double or deformed single blank. Furthermore, it can be well appreciated that the occurrence of an abnormal condition at high speeds is of a far more serious nature than at slow speeds.

It is the purpose of this invention therefore to provide a lock seamer which is fully automatic, continuous in operation, and operable at speeds relatively higher than has heretofore been considered possible and practicable.

In accordance with this invention I have provided first, set back mechanism for accurately positioning the blanks on the slide at the various operating and forming stations to counteract the tendency at high speeds to overfeed the blanks and in a manner which will not interfere with accessibility to the blanks; second, limit stops for stopping the driving motor, rather than opening a clutch, upon the occurrence of an abnormal condition; third, means for applying a flux to the edge of the blanks before they are interlocked; and fourth, a centralized drive which balances the entire machine, eliminates unnecessary elements and reduces vibrations.

Other novel features will be observed and a better understanding will be had of this invention from a consideration of the following detailed description given in connection with the drawings in which:

Fig. 3 is a vertical section taken on line 3—3 of Figs. 1 and 2.

Fig. 4 is an end view of a blank after the first edging operation.

Fig. 5 is a vertical section taken along line 5—5 of Figs. 1 and 2.

Fig. 6 is an end elevation showing the condition of the blank after the second edging operation.

Fig. 7 is a longitudinal vertical section taken along line 7—7 of Fig. 1.

Fig. 8 is an enlarged partial section taken substantially along the line 7—7 of Fig. 1.

Fig. 9 is a detailed section taken on line 9—9 of Fig. 7.

Fig. 10 is an enlarged detail partly in section of the flux pot.

Fig. 11 is a section taken along line 11—11 of Fig. 1 also illustrating diagrammatically the electrical circuit involved in the safety device, and Fig. 12 is an enlarged detail illustrating the action of a safety device when a deformed blank is encountered.

Figure 1:
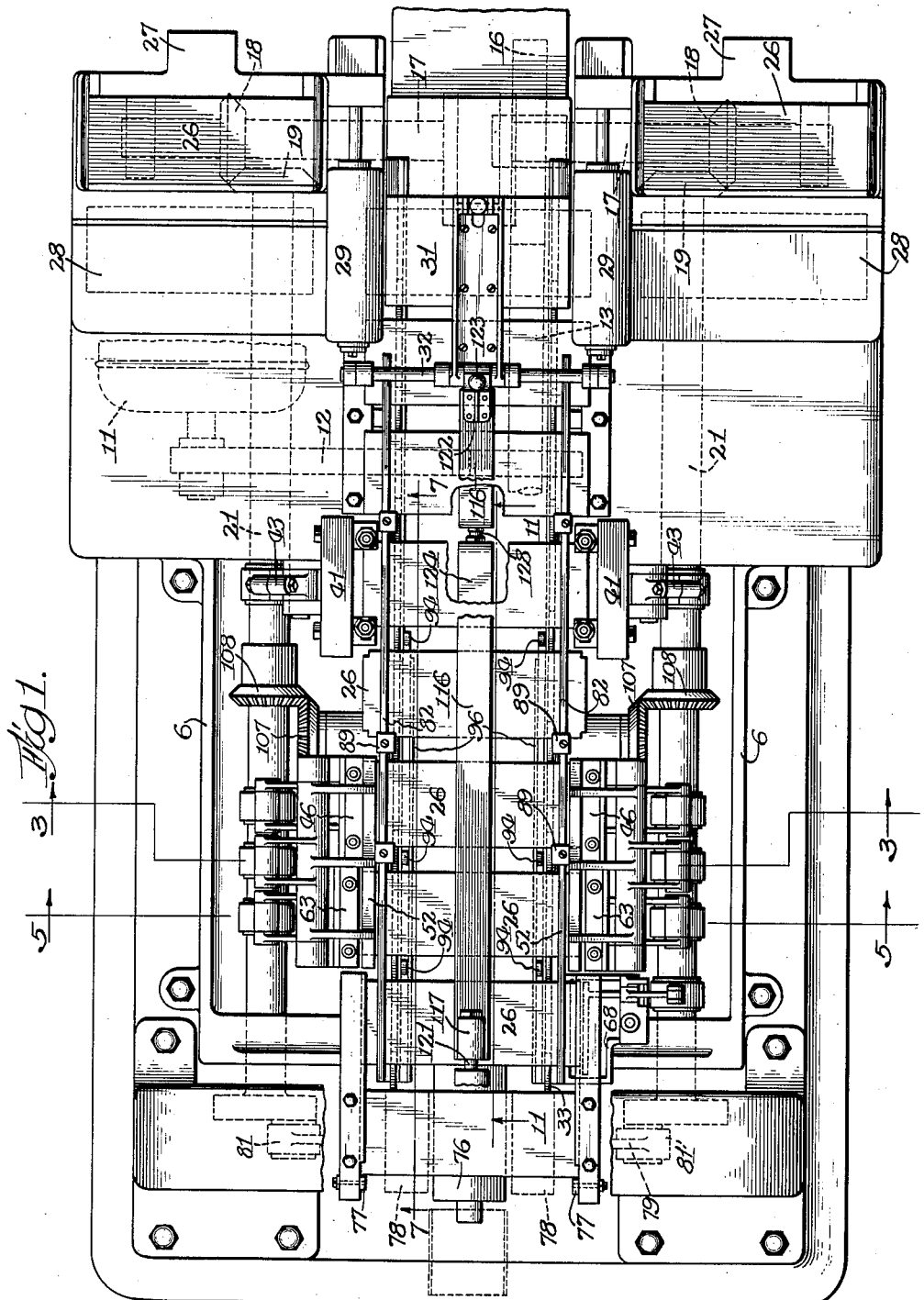
Fig. 1 is a plan view of a machine constructed in accordance with this invention.

Referring more particularly to the drawings, the entire machine is supported from a bed or base 1 having two end standards 2 and 3 secured to each end thereof which in turn support a table 4 to which is secured a pair of longitudinal parallel L-shaped frame members 6. The frame members are secured to the table 4 for adjustment toward and from each other and may be secured in adjusted position by screws 7. This adjustment permits the handling of various length cam body blanks. The upper edges of the frame members 6 are finished off parallel and constitute a slide extending the length of the machine along which the blanks of sheet material may be passed to the various stations at which the preparatory operations are performed prior to the forming of the blank into a cylindrical body. The table 4 is provided with a center web 8 which carries a movable center support for the center of the blanks as will hereafter be described.

Figure 2:
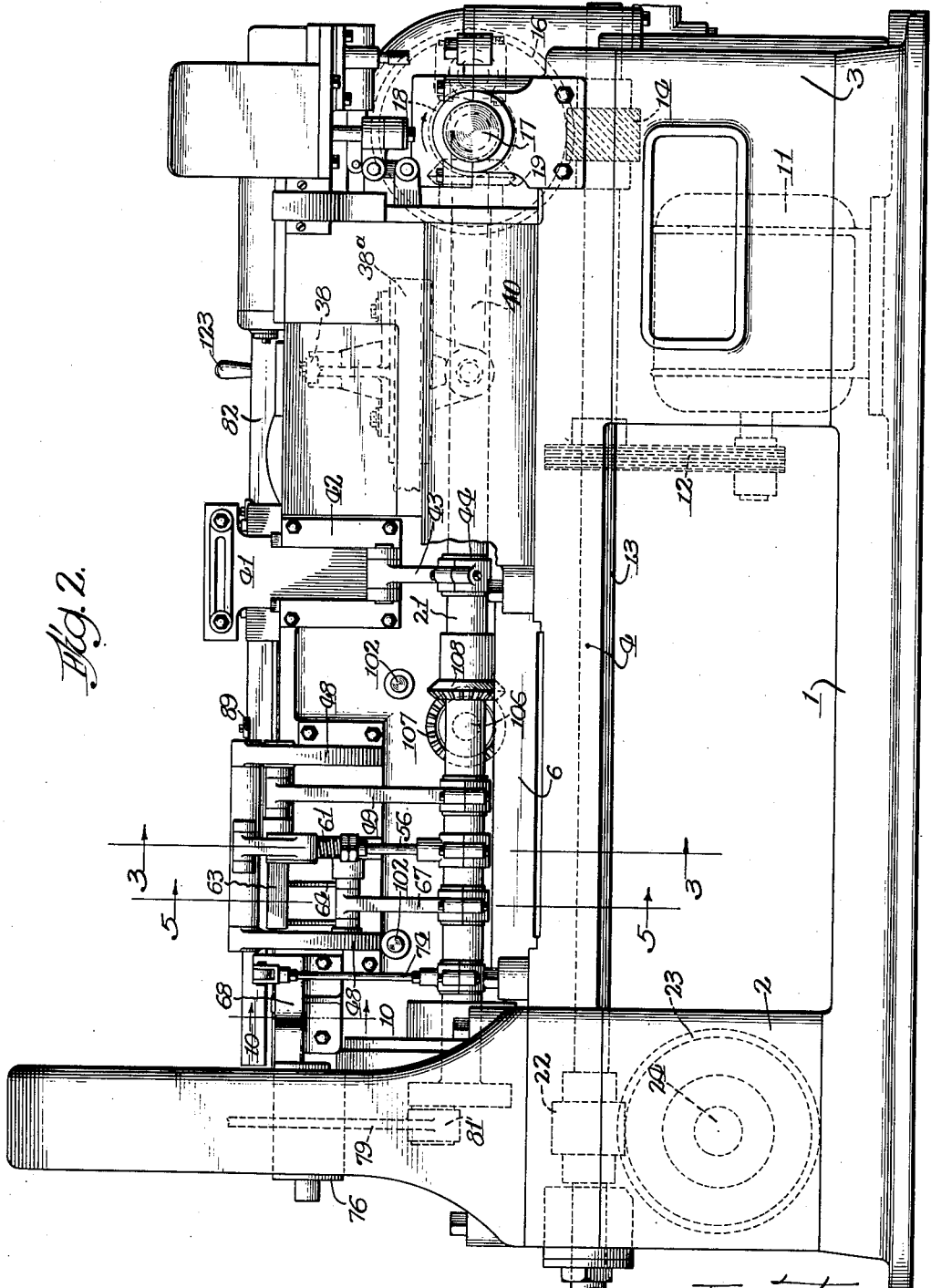
Fig. 2 is a side elevation of the machine shown in Fig. 1.

The entire machine is driven from a single source of power such as an electric motor 11 connected by a chain 12 to a centrally disposed main drive shaft 13 extending longitudinally the length of the machine, the motor and main shaft both being below table 4 (Fig. 2). At its forward end shaft 13 carries a worm 14 which engages a worm wheel 16 upon a cross shaft 17. The cross shaft 17 extends laterally to each side of the machine having a crank pin at its center, and adjacent each end carries a bevel gear 18 which gears mesh with complementary bevel gears 19 upon the forward ends of parallel drive shafts 21. The shafts 21 are journalled in bearings carried by frames 6 and serve to drive the several operating devices for forming the blanks into cam bodies as will hereafter be described. The main drive shaft 13 has secured at its rear end a worm 22 which engages a worm wheel 23 upon a shaft 24 from which the horn and hammer mechanisms are operated. The latter form no part of this invention and are therefore not shown.

The sheets or blanks from which the bodies are to be formed are fed to the slide by any suitable feeding mechanism. In the present instance a duplex feeding system is illustrated generally and comprises two stacks of blanks 26 supported in magazines 27 from which they are fed by a suitable feeding mechanism (not shown) to detecting stations 28. From the detecting stations the blanks are fed between rollers 29 and on to the front end of the slide being held thereagainst by a plate 31. Plate 31 is hinged to a rod 32 to permit raising thereof for inspection of the blanks.

The blanks are fed along the slide or top edges of frames 6 by pairs of feed dogs 33 pivoted to feed bars 34 mounted for sliding movements in channels formed in the upper ends of each of the frames 6. The dogs are pivoted with their rearwardly directed ends resiliently urged upwardly by springs 36 which permit the dogs to pass under the blanks on return movements (Fig. 8) thereof and to engage the blanks on their forward movement. The feed bars 34 and dogs 33 are retained in position by a guide plate 37. The feed bars are tied together by a cross member 38 (Figs. 2 and 3) secured to a cross head 38ª connected to a connecting rod 40 operable upon a crank pin on shaft 17 in the customary manner. The latter operating connections being usual in this type machine are therefore not shown in detail.

Considering the machine in the order of the successive operations it performs and referring to the sections or stations of the machine in the order in which they treat a blank, the blanks are first fed from the position deposited on the slide by one pair of feed dogs to the notching station shown more particularly in Fig. 3. At the notching station the corners of the blanks are notched as is shown in Fig. 1 where one blank is illustrated as having just left the notching station. For performing the notching operation there is provided a pair of punches 39 overlying each frame at one end thereof (Figs. 1, 2, and 7). The punches over each frame are adjustably carried in a reciprocating plate 41 mounted for vertical reciprocations between guideways 42 secured to the frame members 6. To the lower end of each plate 41 is pivotally connected one end of a connecting rod 43 the other end of which is provided with a strap which surrounds an eccentric 44 upon shaft 21.

From the notching station the blanks are moved by a second pair of feed dogs to the first edging station. At this point the two end edges of the blank are bent at right angles to the blank, one edge being bent upwardly and the other downwardly as illustrated in Fig. 4. The mechanism for accomplishing this operation is best shown in Fig. 3 and comprises a pair of dies 46 carried upon the ends of arms 47 pivoted to brackets 48 secured to the frames 6. To the outer ends of arms 47 are connected the upper ends of connecting rods 49 the lower ends of which engage eccentrics on shafts 21. The left die 46 of Fig. 3 is arranged to bend the projecting end of the blank upwardly while the right die 46 is arranged to bend the projecting end of the blank downwardly. The upper edges of rail 6 are provided with complementary die members or bars 51 inset therein and which may be removed at will as may be the dies 46.

In order to rigidly hold the blanks during the edging operations clamping bars 52 are provided for engaging the edge of the blank directly over the bars 51. The clamping bars 52 are carried upon the inner ends of arms 53 pivoted intermediate their ends at 54 to the upper ends of brackets 48. The outer ends of arms 53 are pivotally connected to the upper ends of connecting rods 56 the lower ends of which are formed with eccentric straps surrounding eccentrics carried by shafts 21.

To accommodate for varying thicknesses of blanks the connection between the outer ends of arms 53 and the upper ends of rods 56 are made yielding. To this end the upper ends of connecting rods 56 extend into socket members 57 which in turn are pivoted to the outer ends of arms 53. The connecting rods 56 are in the form of round rods threaded to receive nuts 58 upon their upper end and additional nuts 59 spaced therefrom between which the socket members 57 and compression springs 61 are positioned. The eccentrics operating the rods 49 and rods 56 are so timed that while the edging operations take place the bars 52 are clamped down upon the edges of the blanks. Due to the resilient connection between the rods 56 and the arms 53 any variance of thickness of the blanks will be taken up by the movement of rods 56 relatively to the socket members 57 through the compressions of springs 61. Following the first edging operation the arms 52 move upwardly releasing the blank and the blanks are moved to the next station by another pair of feed dogs upon the reciprocating bars.

The next station is the second edging operation which bends the edges back upon the blanks (as shown in Fig. 6) to form hooks to be later engaged when the body is formed around the horn. The second edging operation is shown best in Fig. 5. A pair of die members 63 are removably secured to the upper ends of a pair of bell crank levers 64 pivotally secured at 66 to the brackets 48. The outer arms of levers 64 are pivotally secured to the upper ends of connecting rods 67 which engage eccentrics upon shafts 21. It can be seen from Fig. 5 that as the rods 67 reciprocate vertically the dies 63 will be reciprocated horizontally and engage the edges of the blank to bend the same back toward the body of the blank. The die bars 51 continue along the frames 6 and cooperate with the dies 63.

Arms 52 also extend down to the second edging operation to rigidly hold the blank while the second edging operation is being performed. The clamping bars 52 adjacent the second edging dies are under-cut to permit the projecting end portions of the dies 63 to contact with and bend the edges of the blank inwardly.

Following the second edging operation the blanks are again moved along the slide by another set of freed dogs toward the horn and to the next station which is a fluxing station. At this station one edge of the blank is coated with a fluxing solution in the manner best shown in Fig. 10. It will be seen that one hooked edge of the blank passes through a flux pot 68 the end walls being slotted as at 69 to permit the hooked end to pass therethrough. Within the flux pot and normally remaining emersed therein is a pad of felt or the like 71 secured to the end of a bell crank lever 72 pivoted at 73 to an upstanding lug formed on the pot. The outer end of the bell crank lever 71 is connected to the upper end of a connecting rod 74 the lower end of which engages another eccentric on shaft 21. The eccentric is so timed that the pad 71 is brought up into engagement with the hooked end of the blanks during the pause of the blanks at the fluxing station.

From the fluxing station the blanks are fed by another pair of feed dogs on to the horn 76 and against a pair of fixed stops 77 adjustably carried upon the ends of frame 6. These stops serve to accurately square the blank before the blank is formed around the horn. The forming operation is performed by wings 78 actuated by rods 79 from cranks 81 carried upon the rear ends of shafts 21. The horn and wing mechanisms form no part of this invention and are therefore not shown nor described in detail.

In order to retain the ends of the blanks in contact with the upper edges of frames 6 there are provided relatively heavy bars 82 (Figs. 7 and 8) which overlie each frame member 6 and are secured thereto. Depending from the lower edge of said bar are a series of presser fingers 83 which are secured to the bars by dowell pins 84 and are resiliently urged in contact with the blanks by compression springs 86. The forward ends of the bars are bevelled as at 87 in order that the leading edge of the blanks may pass thereunder.

The bars also carry a series of stops 88 adjustably secured thereon one being positioned over each rail at each station to accurately locate one edge of the blank. The stops 88 are pivotally secured to blocks 89 and are urged downwardly into the path of the blanks by springs 91 the pivotal point being so arranged that upon forward movement of the blanks they may pass under the stops. As soon as the blanks clear the front edge of the stops the latter move downwardly into contact with the upper surface of frames 6.

Due to the high speed at which the machine operates there is a tendency for the blanks to be carried beyond the edge of the stops. It is therefore necessary to provide some means for bringing the blanks back to the positioning stops. For this purpose there is provided a set back mechanism comprising a pair of plates 93, the upper edges of which terminate in spaced dogs 94. The plates are positioned in upright position alongside of each of the guide plates 37 and are held thereagainst by retaining plates 96 with the dogs 94 movable into the path of movement of the blanks. The lower edge of plate 93 is adjustably secured to a beam 97 the latter being pivotally secured to the upper ends of arms 98 and 99 pivoted at 101 and 102 respectively to the frames 6. Arms 99 continue below their pivotal points 102 and are connected at their lower ends to one end of connecting rods 103, the opposite ends of which engage crank pins 104 upon crank shafts 106 journalled in frames 6. The outer ends of shafts 106 carry bevel gears 107 which mesh with bevel gears 108 upon shafts 21.

From the above it can be seen that upon rotation of shaft 21 beam 97 and consequently plate 93 will be given on arcuate motion about pivots 101 and 102. This arcuate motion will project dogs 94 into and out of the path of movement of the blank to engage the blank and move it back into engagement with stops 88. In Fig. 7 the dogs 94 are shown beginning their movement toward the blanks whereas in Fig. 8 the dogs are shown as having moved the blanks back into engagement with stops 88.

In order to allow for slight variations in width of blanks the connecting rod 103 is made in two sections resiliently connected together as shown more particularly in Figs. 7 and 9. The crank pin end is provided with a sleeve 109 which receives the round end 111 of the second section for sliding engagement. Movement in one direction of the second section is prevented by a collar 112 and is resiliently prevented in the other direction by a spring 113 surrounding the rod and placed under compression between sleeve 109 and nuts 114 on the second section. The movement of plate 93 and dogs 94 is so timed that the dogs 94 engage the blanks as the feed dogs 33 are returned to engage the next blank.

It is very important that in high speed machines for handling sheet material and particularly machines of the character herein described some means be provided for stopping the machine immediately should some abnormal condition occur such as the presence of a double, curled, or deformed blank. Heretofore in relatively slow speed machines it has been attempted to stop the transfer of the blanks through the machine under such conditions by throwing a clutch which would disconnect the driving source from the transfer mechanism leaving the source of power such as a pulley or motor running. The disengagement and reengagement of a clutch in this manner is very impractical particularly in high speed machines where it is destructive to reengage a clutch with one member running at high speed and the other member stationary.

In the present machine means are provided for stopping the complete machine immediately should such an occurrence take place anywhere from the moment the blank enters the slide to the time it leaves the slide. Disposed longitudinally of the machine and between the two frames 6 is an upper stationary bar 116 supported directly over the center of the blanks and in contact with the upper surface thereof. The rear end of the bar is provided with a socket 117 (Fig. 11) within which is resiliently mounted a plunger 118 constantly urged rearwardly by a spring 119. The socket 117 and plunger 118 engage a stationary center 121 supported in the yoke surrounding the horn. The front end of bar 116 is provided with a bracket 122 (Fig. 1) having an arcuate portion arranged to engage rod 32 and having a handle 123 by which the rod may be moved rearwardly against the action of spring 119 to release the bracket 122 from rod 32 and permit the removal of the bar 116.

Immediately below bar 116 and leaving only sufficient clearance therebetween to permit the passage of blanks of normal thickness is a movable detector bar or guide 124 (Figs. 11 and 12) supported adjacent each end by links 126. The links are pivoted at one end to the bar and at the other end to lugs 127 secured to web 8. The bar 124 is thus mounted for arcuate movements toward and from the stationary bar 116. Bar 124 is provided at its front end with an angle lug 127 into which is threaded an adjustable set screw 128 positioned to engage a complementary angle lug 129 to limit the movement of the bar 124 in the direction toward bar 116. Bar 124 is normally urged toward bar 116 by means of a spring 131 secured under tension between two pins 132 depending from lugs 127 and 129.

The movable bar 124 is a gauge for detecting the thickness of material passing thereover and its movements are utilized to actuate a safety cut off device to stop the machine should material of greater thickness than a predetermined value such as two or more blanks or a single deformed blank enter the machine or become involved in the machine during its operation. To this end one link 133 is pivotally connected adjacent the upper end of links 126. The other end of link 133 is connected to one arm of a bell crank lever 134 the other arm of which has attached thereto a switch element 136 arranged to bridge a pair of contacts 137 in a solenoid circuit 138 by means of which the solenoid 139 is controlled. The solenoid 139 controls a pair of switch contacts 131 in the motor circuit 142 which controls the motor 28 for driving the entire machine. By attaching link 133 to 126 adjacent the upper end of the latter advantage is taken of slight movements of bar 124 to produce sufficient movement of lever 134 to actuate switch element 136. By controlling the driving motor the entire machine is stopped rather than merely stopping one portion thereof. In Fig. 11 the machine is shown in normal operating condition, that is, switch 136 and contacts 141 are closed. In Fig. 12 an exaggerated abnormal condition is shown wherein bar 134 has been moved downwardly by a deformed blank resulting in the opening of switch 136 and contacts 141.

The operation of the machine is believed to be obvious from the foregoing description and it will therefore only be necessary to summarize briefly the operations and functions of the various elements of the machine. Suitable blanks 26 from the magazines 27 are fed from magazines by a suitable feed mechanism to the forward ends of frames 6 and deposited upon the upper edges thereof which constitute the slide. The first pair of feed dogs 33 then function to advance a blank along the slide to the first operation which notches the corners of the blank. From this position a second pair of feed dogs advance the blank to the first edging operation where the end edges of the blanks are bent at right angles. The next pair of feed dogs having passed under the blank then engage the rear edge thereof and advance the blank to the second edging operation which curls the bent edges back toward the body of the blank.

While the edging operations are being performed the clamping bars 52 have been held upon the blank directly over the upper edges of rails 6. The blank is then advanced by another pair of feed dogs to the fluxing station where the edges of the blank are treated with a fluxing solution. From this position the blank is fed on to the horn and against stops 77 where the blank is shaped into a cam body and lock seamed.

At each station the blank is accurately located by being set back against stationary stops 88 by means of the dogs 94 projecting from the upper edge of plate 93. Plate 93 is actuated by connecting rod 103 upon crank pin 104. During the passage of the blank down the slide it is supported at its center from the under side by bar 124 and is prevented from buckling by stationary bar 116 and pressure fingers 83.

Bar 124 also constitutes a safety device extending the entire length of the machine and will function to stop the machine providing a blank becomes deformed or a blank of greater thickness than a normal single blank occurs in the machine at any point. It is obvious that although the operations have been described in connection with a single blank a series of blanks are being progressively and successively advanced down the slide in intermittent steps.

It is believed that from the above description it is apparent that there is provided a machine which is of relatively high speed, fully automatic and substantially fool proof. All of the mechanisms for operating upon the edges of the blanks to prepare the blank for formation upon the horn are operated from the two parallel shafts 21 extending down the sides of the machine which two shafts are driven from a centrally disposed main shaft 13. This arrangement of driving elements gives a perfectly balanced machine reducing vibration to a minimum. Upon the occurrence of any abnormal condition the driving motor itself is stopped which eliminates the disengaging and reengaging of clutches at destructive high speeds and which always insures the lock seamer being in proper timed relation to associated units.

It is obvious that many changes may be made in the details of construction without departing from the spirit and scope of the invention as defined in the claims appended hereto.

I claim:

1. In a can body forming machine, a slide along which can body blanks are progressively advanced, mechanisms for operating upon the blanks situated at stations along the slide, means for advancing blanks in one direction along said slide to said stations and stops along said slides at each of said stations for accurately positioning the blanks and resiliently mounted reciprocating feed dogs movable into and out of the path of movement of said blanks.

2. In a can body forming machine, a pair of members constituting a slide along which can body blanks are progressively advanced, mechanisms for operating upon the blanks situated at stations along the slide, means for intermittently advancing blanks in one direction along said slide to said stations, presser feet overlying said members and arranged to maintain said blanks in contact therewith, reciprocating clamping bars and means for actuating said bars in predetermined sequence to hold said blanks intermittently during non-advancing periods.

3. In a can body forming machine, a pair of members constituting a slide along which can body blanks are progressively advanced, mechanisms for operating upon the blanks situated at stations along the slide, means for advancing blanks in one direction along said slide to said stations and rigid stops at the ends of said members for accurately positioning the leading edge of said blanks at the end of said members.

4. In a can body forming machine, a slide along which can body blanks are progressively advanced, means for advancing blanks along said slide to said stations, mechanisms for operating upon the blanks situated at stations along the slide including a fluxing mechanism comprising a flux pot and a reciprocating arm arranged to alternately dip into said pot and contact with the edge of said blanks while said blank is in a flat condition and means for thereafter forming said blank into a can body.

5. In a can body forming machine, a slide along which can body blanks are progressively advanced, mechanisms for operating on the blanks situated at stations along the slide, means for advancing blanks along the slide, a relatively stationary member extending substantially the full length of the slide and positioned to contact with the blanks passing along said slide, a relatively movable member extending substantially the full length of the slide and arranged to contact with the other side of said blanks, and means associated with said movable member for interrupting the movement of said advancing means upon predetermined movement of said movable member.

6. In a can body forming machine, a slide along which can body blanks are progressively advanced, mechanisms for operating upon the blanks situated at stations along the slide, means for advancing blanks in one direction along the slide to said stations, a relatively stationary member extending substantially the full length of said slide and arranged to contact with one side of said blanks passing along said slide, a relatively movable member extending substantially the full length of said slide and arranged to contact with the other side of said blanks passing along said slide, said movable member being pivoted for arcuate movements toward and from the path of said blanks and means operable by said movable member for stopping said advancing mechanism upon predetermined movement of said movable member from said stationary member.

7. In a can body forming machine, a slide along which can body blanks are progressively advanced, mechanisms for operating upon the blanks situated at stations along the slide, means for advancing blanks in one direction along the slide to said stations, a prime mover for actuating said mechanisms and said advancing means, a relatively stationary member extending substantially the full length of said slide and arranged to contact with one side of said blanks passing along said slide, a relatively movable member extending substantially the full length of said slide and arranged to contact with the other side of said blanks passing along said slide, said movable member being pivoted for arcuate movements toward and from the path of said blanks and means operable by said movable member for stopping said prime mover upon predetermined movement of said movable member from said stationary member.

8. In a can body forming machine, a slide along which can body blanks are progressively advanced, mechanisms for operating upon the blanks situated at stations along the slide, a drive shaft upon each side of said slide and parallel thereto, connections between said shafts and said mechanisms for operating the latter from said shafts, a main driving shaft between said first mentioned shafts, a cross shaft driven from said main shaft said latter shaft being operatively connected to both of said first mentioned shafts and a prime mover for rotating said main shaft.

9. In a can body forming machine, a slide along which can body blanks are progressively advanced, mechanisms for operating upon blanks situated at stations along the slide, means for advancing blanks in one direction along said slide to said stations, stops along said slide at each of said stations for accurately positioning the blanks, blank set back mechanism normally positioned below said slide and movable upwardly into the path of movement of said blanks when in operating position to positively engage the leading end of said blanks, and means for moving said set back mechanism into operating position and in a direction opposite to said advancing means for positioning said blanks against said stops.

10. In a can body forming machine, a slide along which can body blanks are progressively advanced, mechanisms for operating upon the blanks situated at stations along the slides, means for advancing blanks in one direction along said slide to said stations, stops along said slides at each of said stations projecting from above said slide into the path of movement of said blanks for accurately positioning the blanks at said stations, reciprocating feed dogs normally positioned below said slide and movable into the path of movement of said blanks to positively engage the leading end thereof, and means positioned below said slide for moving said feed dogs into engagement with said blanks in a direction opposite to said advancing means to position said blanks against said stops.

11. In a can body forming machine, a slide along which can body blanks are progressively advanced, mechanisms for simultaneously operating upon the blanks situated at a plurality of stations along the slide, means for advancing blanks in one direction along said slide to said stations, an electric motor for actuating said mechanisms and said advancing means, means normally in position to be engaged by a blank or blanks of abnormal thickness throughout substantially the entire length of said slide and at said stations, said means being movable toward and from the path of said blanks, and means operable by said means for interrupting the current supply to said motor upon predetermined movement of said movable member to stop said mechanisms and said advancing means.

12. In a can body forming machine, a slide along which can body blanks are progressively advanced, mechanisms for simultaneously operating upon the blanks situated at a plurality of stations along the slide, means for advancing blanks along the slide, an electric motor for actuating said advancing means, a relatively stationary member extending substantially the full length of the slide and at said stations and positioned to contact the blanks passing along said slide, a relatively movable member extending substantially the full length of said slide and at said stations and means actuated by said member to interrupt the current supply to said motor upon predetermined movement of said movable member.

In witness of the foregoing I affix my signature.

WILLIAM CAMERON.